Aug. 19, 1924.

A. GEIGER 1,505,191

METHOD OF AND MACHINE FOR MAKING HEELS

Filed April 2, 1923

Inventor:
Adolph Geiger

Aug. 19, 1924.

A. GEIGER 1,505,191

METHOD OF AND MACHINE FOR MAKING HEELS

Filed April 2, 1923      5 Sheets-Sheet 2

Fig 2.

Inventor:
Adolph Geiger

Aug. 19, 1924.

A. GEIGER

1,505,191

METHOD OF AND MACHINE FOR MAKING HEELS

Filed April 2, 1923 5 Sheets-Sheet 4

Inventor
Adolph Geiger

Aug. 19, 1924.

A. GEIGER 1,505,191

METHOD OF AND MACHINE FOR MAKING HEELS

Filed April 2, 1923    5 Sheets-Sheet 5

Inventor:
Adolph Geiger

Patented Aug. 19, 1924.

1,505,191

UNITED STATES PATENT OFFICE.

ADOLPH GEIGER, OF STUTTGART, GERMANY.

METHOD OF AND MACHINE FOR MAKING HEELS.

Application filed April 2, 1923. Serial No. 629,429.

*To all whom it may concern:*

Be it known, that I, ADOLPH GEIGER, a citizen of the United States of America, residing at Stuttgart, Germany, have invented certain new and useful Improvements in Methods of and Machines for Making Heels, of which the following is a specification.

This invention relates to certain new and useful improvements in heel making and in heel making machines and has for its object to provide effective means for handling individual lifts and composing the latter to heel blanks.

One feature of the invention is to be seen in the step that holes are punched in the single lifts adapted for threading the said lifts on guiding pins while building up the heels.

Another feature of the invention consists of means for gripping the punched lifts, passing them through a vessel containing paste, and putting them in proper order on a table underneath the said pins in order to be threaded on the latter.

Yet another feature of the invention consists in special means for moving the composed heels in a compressed state on the pins from the assembling means to means ejecting the finished heels.

Another feature of the invention relates to means for circulating the means serving for separating the heels, while being threaded on the guiding pins.

Other objects of the invention and features by which they are attained will be readily understood by those skilled in the art from the following description of the preferred embodiment of the invention illustrated in the accompanying drawings, in which

Figure 3ª shows means for holding the lifts while being punched.

The loose lifts are contained in a drum 1, divided in several compartments for lifts of different sizes, preferably twelve in number. The drum is carried by the shaft 2 suitably journaled and has fastened to it a Maltese wheel 3. The rotation of the drum is effected by means of a shaft 4 engaging with the roller 7 on its crank-arm 90 into gaps between the arms 91 of the wheel 3. The rotation of the shaft 4 proper is derived from the main-shaft 6 of the machine by means of a worm-gear 5. The wheel 3 possesses as many arms 91 as there are compartments in the drum 1. In the case of twelve compartments each rotation of the shaft 6 causes the drum to rotate about one-twelfth of a full revolution. On the end of the shaft 6 there is provided a half-moon like hub 8 adapted to enter into the ends 92 of the arms 91 milled out in order to lock the drum 1 when the shaft 6 is at rest and to allow of a simultaneous rotation of the drum 1 and the shaft 6.

Every compartment of the drum 1 has a separate cover 9 normally closed by means of a spring 93 and a hooked lever 10. The hooked levers 10 engage with their hook-shaped ends projecting dogs 94 of the covers and are adapted to ride with the rollers 12 at their rearward ends over the curved guides 11 so as to disengage the hooks from the said dogs 94 and to unlock the covers. The unlocked cover now rides with rollers 14 over the curved guides 13 which open the cover. It is evident that the unlocking and opening of each cover occurs each time it reaches its uppermost position.

Figures 3, 3A:
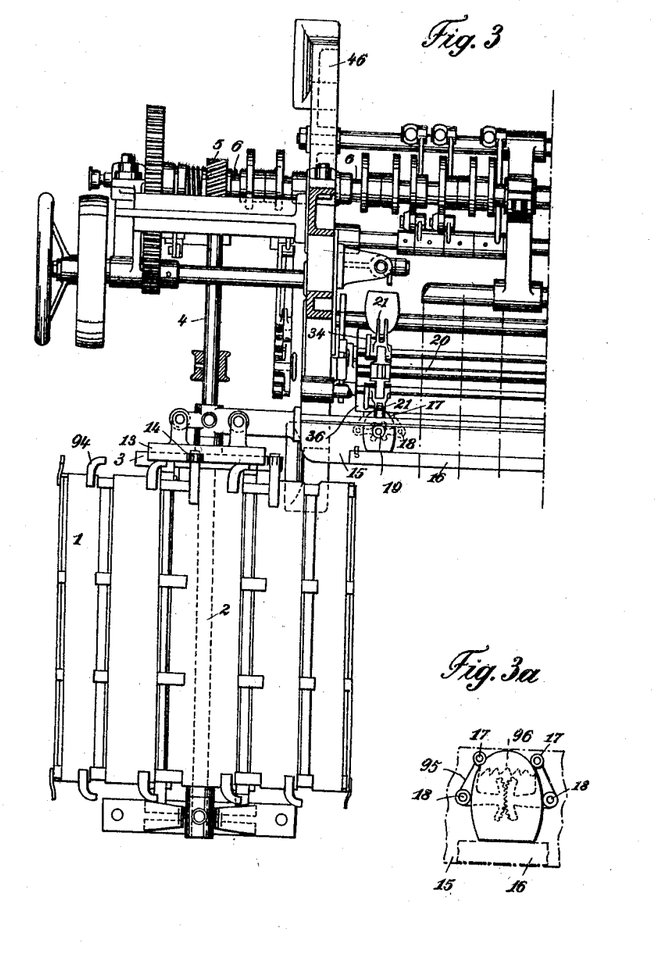
Figure 4:
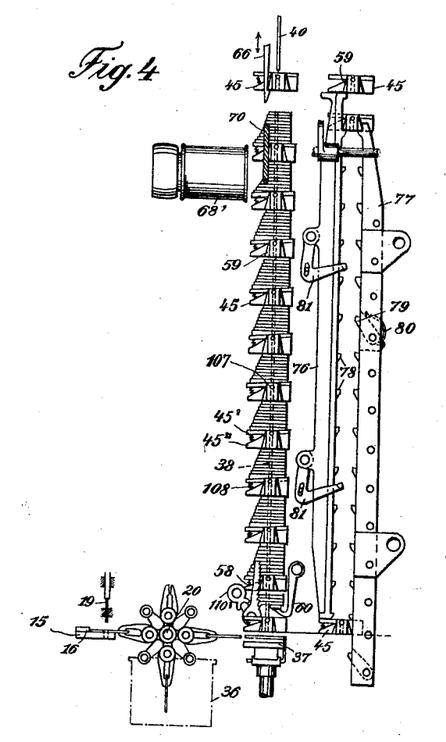
Figure 4 illustrates the main working parts of the machine in side elevation.

The drum is arranged to the left of the operator standing in front of the machine as illustrated in Figure 3. In the preferred embodiment of the machine eight heel blanks are simultaneously built up. Accordingly, the operator picks up with his left hand eight lifts of the open compartment of the drum. He then puts said lifts with his right hand on the table 15 so as to clamp them between the ledge 16 and the rollers 17. The rollers 17 are arranged on the ends of the elbow-levers 95 pivoted at 18. The said elbow-levers 95 are in engagement by means of toothed segments on their opposite ends. A spring 96 connecting the levers 95 tends to approach the rollers 17. Eight pair of levers 95 are provided. The other members of the machine working upon the lifts and blanks are likewise provided in an eightfold number, so that it will suffice to describe only one of each of these devices.

Figure 5:
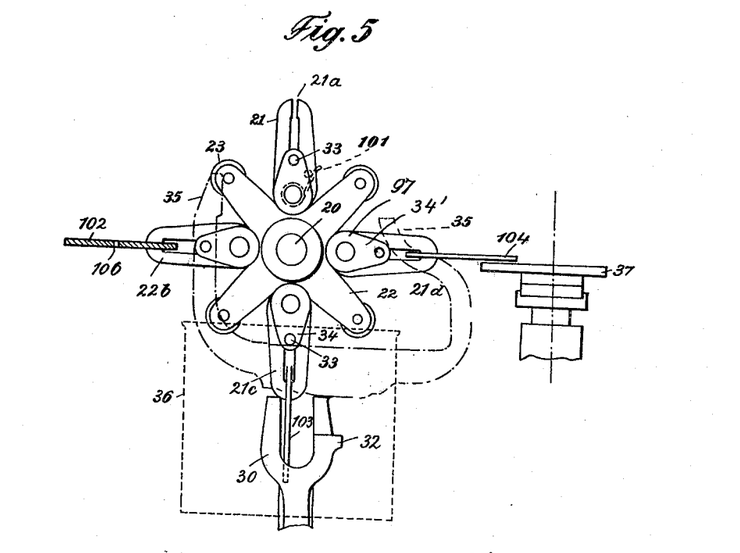
Figures 5 and 5ª show in different positions the grippers carrying the single lifts from the punching means to the heel composing means.
Figure 5A:
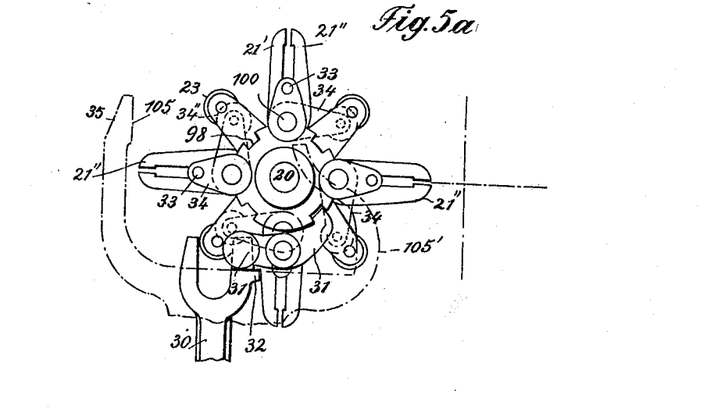

Above the table 15 there are arranged eight punching apparatus 19 punching out in every lift upon the table 15 a small hole for the purpose hereinafter set forth. A shaft 20 on the rear of the table 15 carries at either end a four-armed spider 22 and eight gripping members 97, each of which shows four grippers $21^a$, $21^b$, $21^c$ and $21^d$ arranged crosswise. The gripping members and the spiders are fastened to the shaft 20 and caused to rotate with the latter. The said shaft 20 is journaled in blocks 24 adapted to slide with the shaft to and fro in guides 25. The said blocks 24 possess eyes 26 serving for pivoting the horizontal bars 27 connected at their other ends to the levers 28 oscillated in any suitable manner by means of cams provided on the main shaft 6. Besides this horizontal movement the gripping-members 97 perform also a rotary movement, which latter is caused to take place by vertically movable forks 30. Every time the shaft 20 occupies its outermost right position, see Figure $5^a$, the said forks 30 travel upwards and engage a roller 23 provided on the end of an arm of the spiders 22. When the spiders are returning to their left position they are forced to rotate for a quarter of a revolution as the said roller 23 is retained by the said forks 30. To prevent an undesired rotation of the said shaft 20 a latch 31 is pivoted in the eye 26 of the block 24 mentioned above. The weight of the said latch tends to hold it in engagement with the notches 98 of the hub 99 on the shaft 20. The fork 30 in moving upwards pushes with its projection 32 the rear end of the latch 31 upwards in order to unlock the shaft 20.

The gripper-jaws 21' are integral with the gripper members while the jaws 21" are movable on pivots 100. The grippers are normally held closed by means of springs 101. To the pivots 100 are secured the elbow-levers 34, 34'. The said levers 34' project with pins 33 between the jaws. By oscillating the elbow-levers 34, 34' the grippers are opened. This oscillating movement is effected by part 35 shaped like a double horn, so that each gripper is opened while in its outermost left or right position.

The gripper-mechanisms serve for handling the single lifts and for transferring them from the table 15 onto the table 37. On the way the said lifts are immersed in paste contained in a receptacle 36. Figure 5 shows the gripper-mechanism in a position between the said horns of the members 35 after gripping a lift from the table 15. The said gripper-mechanism now moves from left to right into the position shown in Figure $5^a$. While so moving the mechanism is locked against rotation by means of the latch 31. The fork 30 raises so that a roller 23 of the spider 22 enters between the prongs of the fork and the dog 32 will unlock the latch 31. The gripper mechanism or carrier moves back in the direction towards the operator and turns while so moving, a quarter of a revolution to the left, because the roller 23 mentioned is retained by the said fork 30. Said quarter of a revolution will fetch the lift 102 into the position of the lift 103 dipping into the vessel 36 containing the paste, and which is raised and lowered at proper intervals as described below. A further quarter-turn brings the lift 103 into the position of the lift 104 on the table 37. The tables 15, 37 have narrow slots permitting the turning grippers to pass therethrough.

From the foregoing the operation of the grippers will be evident. In Figure 5 the grippers $21^a$ are idle, a quarter turn and a movement towards the operator brings them into the outmost left position ready for grasping a lift on the table 15; the roller 34" of the associated elbow-levers 34 has struck against the plane 105 of the horn and opened the jaw 21". A small rectilinear movement to the right suffices to bring the roller 34" out of contact with the said plane 105 for closing the jaws. By continued rectilinear movement to the right and a second quarter-turn the grippers holding the lift are brought over the paste-vessel 36. The third quarter-turn brings the pasted lifts in the right hand horizontal position and a continued rectilinear movement conveys them entirely over the said table 37. The roller 34" lies now against the right horn 105', so that at the fourth quarter-turn the jaw 21" will remain horizontal until the whole gripper-carrier on its return way to the left is far enough from the table 37.

The pasted lifts deposited on the table 37 are threaded by means of their holes 106 on the vertical guide-pins 38. The said pins move up and down in order to receive at their lower ends the loose lifts and to discharge at their upper ends the completed heels. The pins and the threaded lifts and heels are raised by the table 37 and are lowered by the cross-beam 39. The cross-beam 39 is provided with push-pins 40 striking against the pins 38 when being moved downwards by means of the rods 41 and 44 operated by suitable means from the main shaft.

Figure 6:
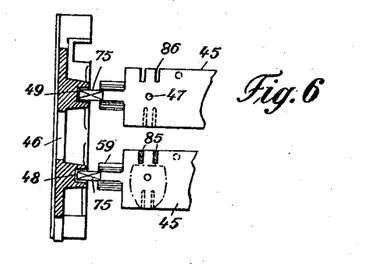
Figure 6 shows the rails serving for separating the heels, in plan view, the sidewall of the machine being in section.

The single heels being built up on the vertical pins 38 are automatically separated by cross rails 45 extending between the side walls 46 of the machine-frame provided with vertical guide-ways 48 for the said rails. The cross-rails consist of upper and lower plates 45′ and 45″ respectively, pivoted at 107 to each other and held apart by means of springs 108 so that they are adapted to accommodate themselves to the inclination of the heel-seat. The said cross-rails compress the heels owing to their weight. The show likewise bores 47 permitting the passage of pins 38 and 40 therethrough. Figure 6 illustrates a side-wall 46 in cross section and the rails 45 in plan view.

Figure 1:
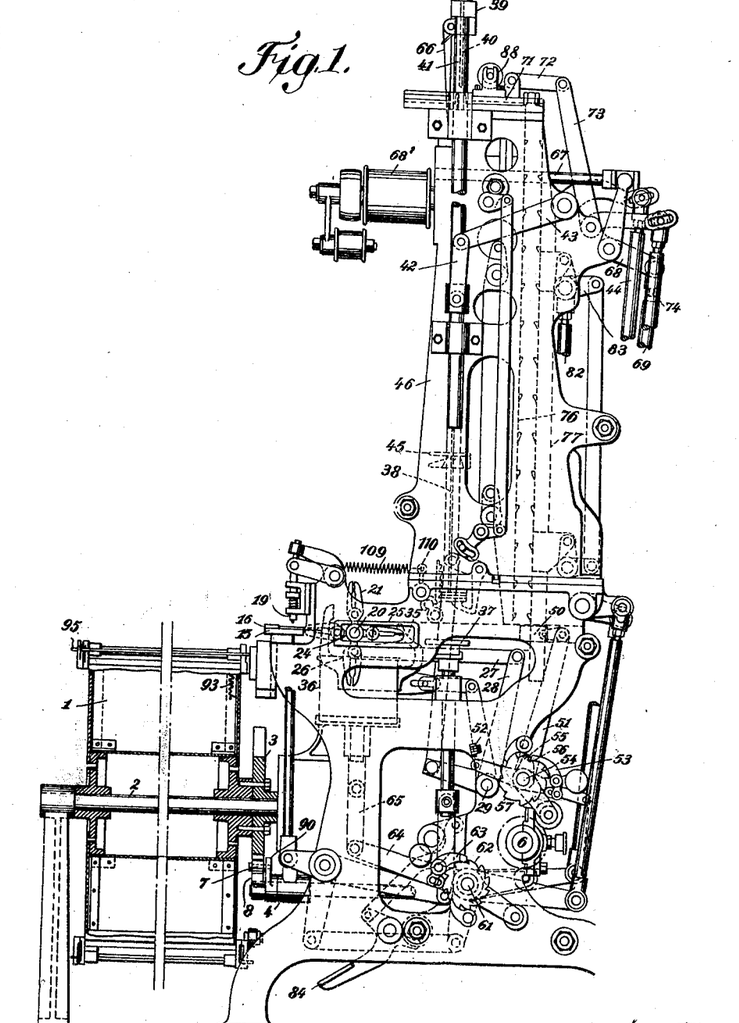
Figure 1 is a right-side elevation of the machine, Figure 2 a front view of the machine, and Figure 3 a top view of the machine, partly in section.
Figure 2:
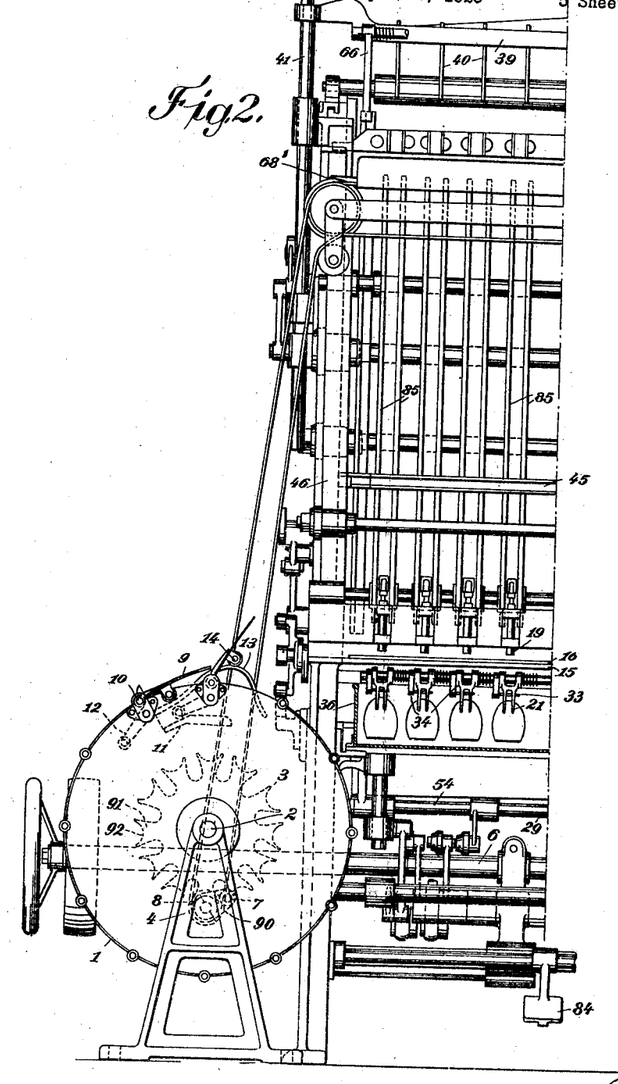

The cross-rails are deposited and piled in guide-ways 49 parallel to the guide-ways 48 in a manner to be described yet. Every time the number of lifts necessary for making heels is threaded upon the guide-pins 38 the lowermost rail of the pile guided in the ways 49 is pushed underneath the pins 38 and the heels are thus assembled. To this end the lowermost parts of the guide-ways 49 form a horizontally movable slide 50 adapted to bring the lowermost rail of the pile out of the guide-ways 49 into line with the guide-ways 48. The movement of the slide 50 is effected by the elbow-lever 51 held in its right position (see Figure 1) by the spring 52 and tilted to the left by a latch 53. The elbow-lever 51 is arranged on the shaft 54 and is connected to the arm 55 which is provided on its end surface with a notch 56. Every time the latch 53 cooperates with the notch 56 the slide 50 carrying a cross-rail 45 is pushed forward. The cooperation of the latch and notch is goverened by a ratchet wheel 57 in such a manner so as to become operative after a predetermined number of lifts necessary for a heel has been assembled. Only one of the gaps of the exchangeable ratchet-wheel 57 is deep enough to allow of the latch 53 entering into the notch 56 of the arm 55. All other gaps of the ratchet-wheel 57 are so shallow that the latch in swinging is prevented from engaging the notch 56. According to the heels consisting of twelve, six or less lifts a ratchet-wheel is used having twelve, six or less gaps respectively, of which only one gap is a deep one.

The pins 38 in moving downward penetrate the cross-rail 45 brought underneath by means of the slide 50 until the strike upon the table 37 or until they enter bores which may be provided in the table 37. In a like manner the pins 38 penetrate the holes of the lifts deposited on the table 37 by the grippers 21. The table 37 being lifted carries with it the rails, the pins 38 and the heels threaded and piled thereon. Toothed sprags 58 engage the sharp edges of the rails for supporting them. The sprags 58 are held in this engagement by the springs 109 and the levers 110, 110′. In their upper movement the heels are guided not only by the pins 38 but also by the vertical bars 85 projecting into the slots 86 of the rails 45 as shown in Figure 6. The heels abut with their straight edges against the bars 85.

After the interposition of a cross-rail 45 fresh lifts are threaded upon the pins 38. Hooked fingers 60 support the threaded lifts and retain the latter in position while the pins 38 are pushed down. The fingers 60 are made to operate properly by any appropriate means.

The uppermost and the lowermost lifts of the heels are not pasted. For this purpose a ratchet-wheel 62 is arranged on the shaft 61 acting in connection with a pawl 63. The shaft 61 carries also the elbow-lever 64 analogous to the elbow-lever 51. The lever 64 is acted upon at one end by the pawl 63 and connected at the other end by the link 65 with the vessel 36 containing the paste. Every time the pawl 63 is allowed to drop into a deep gap of the wheel 62 it engages the free end of the lever 64. The ratchet-wheel 62 possesses deep gaps except for two shallow ones, corresponding to two lifts not to be pasted. The shallow gaps keep the ratchet 63 out of engagement with the end of the lever 64, so that the ratchet is not able to tilt the lever 64 and to lift the paste-vessel 36.

The upper cross-beam 39 is guided by the rods 41 in the frame and is moved up and down by suitable means. In its uppermost position the push pins 40 are far away from the uppermost heels and rails, so that the latter as well as the heels may by removed laterally, the pins 38 being then pushed down out of the uppermost heels. Two yielding hooks 66 of the cross-beam 39 while moving upwards engage the edges 59 of the uppermost rail and raise the latter. The uppermost heels liberated from the pressure of the rail are pushed out of the machine by the push slide 67 onto a conveyor-band 68′. The slide 67 is moved by the rod 69 suitably connected to the main shaft. The hooks 66 are rendered inoperative by means of adjustable ledges 70 until the uppermost heels come in line with the push-slide 67.

The hooks 66 carry the elevated rail 45 into alinement with the slide 71 moved horizontally by the machine-shaft by means of the levers 72, 74. The slide 71 has slots corresponding to the guide-ways 48 in the side-walls of the machine. When in line with these guide-ways 48 the said slots allow the pins 75 of the elevated rail 45 to enter into the slide 71. The slide 71 now moves with the rail from the receiving position into the delivering position above the guide-ways 49 shown in Figure 1. The idle rails are lowered in the guide-ways 49 by means of the two vertical carriers 76, 77. The carrier 76 has fixed projections 78 adapted to engage the edges 59 of the rails and to support the latter. The carriers 77 serve likewise to support the rails, but their projections 79 are held inwardly by the springs 80 and can yield outwardly. The carriers 76 receive a small lateral rocking movement by means of the crank-levers 81 so that the rails 45 are temporarily supported by the projections 79 of the carriers 77 only. The carriers 77 receive a combined horizontal and vertical movement and they are lowered together with the supported rails by means of the levers 82 for a distance of two projections 78 of the carrier 76 and pass on the rails to the latter carrier, while the carrier 76 swings back against the carrier 77 to take off the rails to be now supported by themselves. The said carriers 76, 77 cooperate in this manner to bring the pile of rails at each step on a lower projection 78. It may happen, that the rails are not properly distanced from each other by two projections but lie closely one upon the other. In these instances the projections 79 of the carrier 77 will yield owing to the springs 80 provided for. At any rate the pile will remain apart from the lowermost rail, in order to easily bring the latter in the position over the table 37 by means of the slide 50.

The operation of the machine is as follows:

After starting the machine by depressing the treadle 84 the lifts on the table 15 are punched. The lifts thus punched and pasted in the preceding rotation of the machine are deposited on the table 37 and the lifts punched during the same rotation are pasted after being punched. The lifts deposited on the table 37 are then threaded upon the pins 38 and pressed against the lifts threaded thereon during the preceding rotations. The heels assembled on the pins 38 are separated and compressed by means of the cross-rails and finally ejected, being almost completely dry. The rails are kept in continuous circulation by being fed over and again to the table 37. The ejected heels are then compressed in special forms on separate machines.

To keep the rails clean and free from paste they are lubricated by the cylinder 88 rolling over them as they pass from the guideways 48 to the guide-ways 49. The rotation of the cylinder 88 is derived from the moving slide 67 by means of a gearing.

Figure 7:
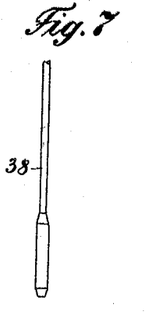
Figure 7 shows a modification of the guiding-pins.

In the embodiment of the machine described the pins 38 are moved upwardly by the table 37 and pressed down by the pins 40. But the machine may be modified in such a way so as to use stationary pins 38. In this case the lower end of the pins 38 is somewhat thicker than the holes punched out in the lifts, so that the threaded lifts are held on the pins by friction and the retaining hooks 60 may be dispensed with. A modified guiding-pin 38 is shown in Figure 7. While the lifts are threaded thereon pins 38 are held down by pins 40. The threading is effected by sufficiently raising the table 37 which may be pierced by the lower projecting ends of the pins 38.

I claim:

1. The method of making heels by punching a hole in the lifts, applying paste to some of the said lifts and threading a series of said punched and pasted lifts with the holes on penetrating guiding-pins so as to form heels.

2. In a heel making machine the combination of means for punching holes in heel-lifts, means for applying paste to some of said lifts, means for assembling a series of lifts so as to form heels and guiding-pins penetrating the holes of the lifts while assembling of said series progresses.

3. In a heel making machine the combination of means for punching holes in heel-lifts, means for applying paste to some of said lifts, means for assembling a series of lifts to form heels, guiding-pins penetrating the holes of the assembled heels, and of the lifts while being assembled into heels, and means separating the built-up heels on the guiding pins.

4. In a heel making machine the combination of means for punching holes in heel-lifts, means for applying paste to some of said lifts, means for assembling a series of lifts to form heels, guiding-pins penetrating the holes of the assembled heels and of the lifts while being assembled, means separating the built-up heels on the guiding pins and means for adjusting the separating means according to the inclination of the heel-seats.

5. In a heel making machine the combination of means for punching holes in heel-lifts, means for applying paste to some of said lifts, means for assembling a series of lifts to form heels, guiding pins penetrating the holes of the said lifts while a series is being assembled and means for gripping the punched lifts and carrying them from the punching means to the pasting and heel assembling means.

6. In a heel making machine the combination of means for punching holes in the heel lifts, means for applying paste to some of said lifts, means for assembling a series of lifts to form heels, guiding-pins penetrating the holes of said lifts while said series is being assembled and grippers revolving and caused to move to and fro and to grasp and carry the punched lifts to the pasting and heel assembling means.

7. In a heel making machine the combination of means for punching holes in heel-lifts, means for applying paste to some of said lifts, means for assembling a series of lifts to form heels, guiding-pins adapted to penetrate the holes of said lifts while said series is being assembled, grippers revolving and caused to move to and fro and to grasp and carry the punched lifts to the pasting and heel assembling means and means for opening and closing said grippers while the latter are in their receiving and delivering positions.

8. In a heel making machine the combination of means for punching holes in heel lifts, means for applying paste to some of said lifts, means for assembling a series of lifts to form heels and guiding pins adapted to penetrate the holes of the lifts while said series is being assembled and a table for receiving the lifts and moving relatively to the guiding pins for threading said lifts and moving them on the guide-pins.

9. In a heel making machine the combination of means for punching holes in heel lifts, means for applying paste to some of said lifts, means for assembling a series of lifts to form heels, guiding-pins adapted to penetrate with one end the said holes of the lifts while said series is being assembled and means for abutting against the other end of the guiding-pins while the lifts are threaded thereon for releasing the said other end and allowing the assembled heels to be removed from said guiding pins.

10. In a heel making machine the combination of means for punching holes in heel-lifts, means for applying paste to some of said lifts, means for assembling a series of lifts to form heels, guiding pins adapted to penetrate the holes of the said lifts while said series is being assembled and means for holding the threaded lifts on the guiding-pins.

11. In a heel making machine the combination of means for punching holes in heel-lifts, means for applying paste to some of said lifts, means for assembling a series of lifts to form heels, guiding-pins adapted to penetrate the holes of the assembled heels and of the lifts while the latter are being assembled into heels, means separating the assembled heels on the guiding-pins and means for supporting the separating means.

12. In a heel making machine the combination of means for punching holes in heel-lifts, means for applying paste to some of said lifts, means for assembling a series of lifts to form heels, guiding pins adapted to penetrate the holes of the assembled heels and of the lifts while the latter are being assembled into heels, means separating the assembled heels on the guiding-pins and means for automatically introducing the separating means between the series of lifts forming the heels.

13. In a heel making machine the combination of means for punching holes in heel lifts, means for applying paste to some of said lifts, means for assembling a series of lifts to form heels, guiding-pins adapted to penetrate the holes of the assembled heels and of the lifts while the latter are being assembled into heels, means separating the assembled heels on the guiding-pins and means for automatically removing said separating means from the heels to be removed from said pins.

14. In a heel making machine the combination of means for applying paste to heel-lifts, means for assembling a series of lifts to form heels, means for guiding the lifts and the composed heels, means separating the composed heels while being guided and means for introducing the separating means between the heels and for removing the same therefrom and for passing the removed separating means in a cycle for reinsertion.

15. In a heel making machine the combination of means for punching holes in heel-lifts, means for applying paste to some of said lifts, means for assembling a series of lifts to form heels, guiding-pins adapted to penetrate the holes of the said lifts and assembled heels and guiding-bars abutting against the edge of the lifts and of the heels.

16. In a heel making machine the combination of means for punching holes in heel lifts, means for applying paste to some of said lifts, means for assembling a series of lifts to form heels, guiding pins adapted to penetrate the holes of the assembled heels and lifts while the latter are being assembled into heels and means for rendering the pasting means inoperative after a predetermined number of paste applications.

17. In a heel making machine the combination of means for punching holes in heel lifts, means for applying paste to some of said lifts, means for assembling a series of lifts to form heels, guiding pins adapted to penetrate the holes of the assembled heels and lifts, means for separating the assembled heels on the guiding-pins, means for inserting the separating means and means for rendering the inserting means operative after a predetermined number of punching operations.

18. In a heel making machine the combination of means for applying paste to heel lifts, means for assembling a series of lifts to form heels, means for guiding the formed heels, means separating the heels and comprising two yielding parts to accommodate themselves to the inclination of the heel seats.

19. In a heel making machine, means for assembling heels of lifts of different sizes, a drum rotating about a horizontal shaft and containing several compartments for the lifts of different sizes, and means for closing and opening the said compartments.

20. In a heel making machine the combination of means for assembling heels of lifts of different sizes, a drum rotating about a horizontal shaft and containing several compartments for the lifts of different sizes, covers for automatically closing the several compartments and automatic means for opening successively the single compartments.

In testimony whereof I affix hereunto my signature.

ADOLPH GEIGER.

Witness:
M. W. ALTAFFER.